(12) United States Patent
Abbink et al.

(10) Patent No.: US 8,102,531 B2
(45) Date of Patent: Jan. 24, 2012

(54) ILLUMINATION SOURCE AND NON-INVASIVE TISSUE SAMPLING SYSTEM

(75) Inventors: Russell E. Abbink, Sandia Park, NM (US); Andrew D. Meigs, Durham, CT (US)

(73) Assignee: Inlight Solutions, Inc., Albuquerque, NM (US)

( * ) Notice: Subject to any disclaimer, the term of this patent is extended or adjusted under 35 U.S.C. 154(b) by 1439 days.

(21) Appl. No.: 11/611,133

(22) Filed: Dec. 15, 2006

(65) Prior Publication Data

US 2008/0146909 A1 Jun. 19, 2008

(51) Int. Cl.
*G01N 21/00* (2006.01)
(52) U.S. Cl. .................................. 356/432; 356/446
(58) Field of Classification Search ............. 356/432, 356/445, 446
See application file for complete search history.

(56) References Cited

U.S. PATENT DOCUMENTS 5,435,309 A * 7/1995 Thomas et al. ............... 600/310

OTHER PUBLICATIONS

Lorber, Avraham, Net Analyte Signal Calculation in Multivariate Calibration, Analytical Chemistry, vol. 69, No. 8, Apr. 15, 1997.

* cited by examiner

*Primary Examiner* — Roy M Punnoose
(74) *Attorney, Agent, or Firm* — V. Gerald Grafe; Inlight Solutions, Inc.

(57) ABSTRACT

The present invention provides an optical transmission device, comprising a chamber having a light input into the chamber, and having a first port allowing light to pass out of the chamber, and comprising internal surfaces where at least a portion of the surfaces is diffusely reflecting, and where at least a portion of the one or more surfaces is specularly reflecting, and where the light input and the first port and the one or more surfaces are configured such that substantially all light entering the chamber via the light source within a first predetermined aperture must encounter the diffusely reflecting portion before exiting the chamber via the first port within a second predetermined aperture. The invention can provide substantially homogenous light transmission, both as a source of light for optical systems and as a collector of light from a sample.

16 Claims, 12 Drawing Sheets

| Condition | Relative output |
|---|---|
| All diffuse surfaces | 1.0 |
| All diffuse except one specular wall adjacent to exit port | 1.05 |
| All of base surface diffuse; all others specular | 1.56 |
| Minimum size diffuse patch on base surface; all other surfaces specular | 2.11 |

ILLUMINATION SOURCE AND NON-INVASIVE TISSUE SAMPLING SYSTEM

RELATED APPLICATIONS

This application is related to U.S. Pat. Nos. 6,574,490; 6,862,091; 6,684,099; and U.S. patent application Ser. No. 10/852,415, each of which is incorporated by reference herein.

TECHNICAL FIELD

The present invention generally relates to the field of diagnostic spectroscopy, and more specifically, to an improved illumination and sample collection device for obtaining spectral information and determining physical properties of a tissue sample. The present invention provides for an illumination device including an element or elements that spatially and angularly homogenize radiation for illuminating a sample under analysis while maintaining a high signal-to-noise ratio. It also provides for integrated means of transporting light to the tissue and collecting light from the tissue for presentation to a spectrometer or detector.

BACKGROUND

Spectral data arising from spectroscopic analysis provides practitioners with a wealth of detailed information about the identity, structure, and concentration of samples or constituents of samples. Spectral data derives from the detected and recorded energy change of a molecule through the emission or absorption of a photon.

Practitioners often focus upon a molecule's vibration. Atoms within a molecular species vibrate back and forth about an average distance Absorption of light by an atom at an appropriate energy causes the atoms to become excited, elevating the atom to a higher vibration level. The excitation of the atoms to an excited state occurs only at certain discrete energy levels, which are characteristic for that particular molecule. Infrared absorption spectroscopy is particularly useful for performing this type of analysis. In absorption spectroscopy, the net absorption of incident radiation at various wavelengths is measured.

Radiation passing through a sample is attenuated depending upon the pathlength traveled by the radiation and the strength of absorptions at various individual wavelengths for constituents within that particular sample. Recording and mapping the relative strength of the absorption versus wavelength results in a unique absorption "fingerprint" or that particular sample.

Cataloging infrared absorption permits practitioners to readily identify unknown samples by cross-referencing their samples of interest with a cataloged database. Matches between the spectrum of a compound of known structure and that of an unknown structure unambiguously identify the latter. This is an illustration of the qualitative aspects of spectrometry. Similarly, spectrometry also aids practitioners in quantitative analysis of known compounds. In illustration, calibration of a spectrophotometer on a known analyte of known concentration permits the accurate measurement of the same analyte of unknown concentration.

Most absorption spectroscopic instruments consist of five components: 1) a source of radiant energy, 2) a wavelength selector that permits the examination of a restricted wavelength region (e.g., a monochromator), 3) one or more sample containers, 4) a radiation detector which converts radiant energy to a measurable signal (usually electrical), and 5) a signal processor and readout.

One application area for multivariate quantitative spectroscopy is the measurement of tissue attributes or analytes noninvasively. A specific application is the measurement of glucose noninvasively for subjects with diabetes. This application is difficult due to the complexity of the tissue, a turbid media, and the small size of the glucose signal. For the measurement of analytes with small concentrations in turbid media, care must be taken to minimize spectroscopic variances that overlap with the absorbance spectrum of the analyte of interest. Spectroscopic interferences are those spectroscopic variances unrelated to the analyte of interest but present during calibration development or during the measurement. Spectral interferences that overlap with or appear similar to the analyte of interest are especially bothersome. Spectroscopic interferences or variances can be classified into four general groups: 1) measurement variance; 2) physiological variance; 3) instrument variance; and 4) sampling variance. Measurement variance is the variance inherent in the data acquisition process. Johnson noise, shot noise, electronic noise and quantization errors are all types of measurement variance or measurement noise. Physiological variances are typically defined by the chemical or structural complexity of the sample. In an example application of noninvasive glucose measurement, significant physiological variance is present due to the complex nature of skin. Instrument variance is any variance due to changes in the performance of the optical measurement system. Change in the performance of the illumination system is a type of instrument variation. Sampling variance is due to errors associated with optical interfacing to the sample of interest. An objective in designing optical measurement instrumentation is to maximize the net analyte signal. The net analyte signal is that portion of the pure component that is orthogonal to the other sources of spectroscopic variation. The pure component spectrum is the absorbance spectrum of the analyte of interest in the absence of other absorbing species. See, for example, "Net Analyte Signal Calculation in Multivariate Calibration," by Avraham Lorber, *Analytical Chemistry Analytical Chemistry*, Vol. 69, No. 8, Apr. 15, 1997.

Practitioners skilled in the art have designed measurement systems that minimize measurement variances associated with the recoding of optical information. In particular, Johnson noise and electronic noise can be minimized through effective instrument design. Additionally, the operation of modern A/D converters using 16-bit or higher digitization can substantially reduce the effect of digitization error. Thus, through instrument design, shot noise can be isolated as the predominant noise source in most modern spectrophotometer systems working in the near-infrared region of the electromagnetic spectra.

Physiological variances are due to compositional or structural differences that vary in the biological sample but are unrelated to the analyte or attribute of interest. Significant complexity is present when the sample of interest is tissue. Biological tissue is commonly characterized as a turbid medium. Turbid media generally fait to permit any single ray of light from following an undisturbed pathway through the medium, in effect, turbid media are non-deterministic. That is, a light ray that enters a turbid medium can undergo several scattering events before finally exiting the medium. When many light rays are directed into a turbid medium, each of the exiting rays collected at any given point will have traveled a different distance through the medium. As a result, a spectrum from a turbid medium source is determined not only by type and concentration of the molecular species in the medium, but also by the scattering characteristics of the media that influence the path distribution of the light traveling through the medium, Instrumentation variances are spectroscopic variations introduced by the optical instrumentation. Instrumentation variances can result in statistically relevant errors. A recognized instrumentation variant is the illumination system. The illumination system is the entire optical system from the source of radiation to the sample or the spectrometer. Common components of an illumination system include the emitter or radiation sources reflective optics, refractive optics, focusing tenses, collimating lenses, fitters, relay optics or optical fibers. A radiation source for absorption measurements must generate a beam with sufficient power in the wavelength region of interest to permit ready detection and measurement. In addition, the radiation source must also provide a reproducible output.

A common source of near-infrared radiation is a tungsten-filament tamp. The energy distribution of this source approximates that of a blackbody, and is thus temperature dependent. In many absorption spectrophotometers, the operating filament temperature is about 2900 K; therefore, the bulk of the energy is emitted in the infrared region. A tungsten-filament lamp is useful for the wavelength regions between 320 and 2500 nm, with limits imposed by absorption in the glass envelope that houses the filament and by emissivity of the tungsten filament.

Another example light source is a resistive element such as those commonly used as igniters for furnaces and stoves. These light sources generally operate at a lower color temperature than tungsten filament lamps and do not need to operate inside a glass envelope. Furthermore, the material from which the heated portion is constructed provides a higher emissivity than a tungsten filament in the 1500 to 2500 nm spectral region, providing a potential improvement in light output for a given electrical input power in this region.

A change in the lamp, adjustment to the lamp or changes within a lamp may affect the resulting spectral data produced by the illumination system. The replacement of the lamp can result in significant spectroscopic variance when using existing illumination systems. The following are four examples of common variants associated with the illumination system. The spectroscopic variance can be due to manufacturing inconsistencies between lamp filaments. Known manufacturing inconsistencies include differences in filament shape, differences in filament location, and differences in filament material. A second source of spectroscopic variance can be caused by rotation or tilting of the same lamp in the lamp housing. A third known source of variance is due to differences in the glass envelope surrounding the filament. Specifically the glass envelope "nipple" can create shadowing and cause inhomogeneous illumination of the sample or sampling apparatus. Finally, the lamp can change with use over time due to vibration or sagging of the filament and to crystallization of the filament. Such changes can cause intensity and temperature variations along the filament length. With current illumination systems, the above changes can cause spectroscopic variances. In maximizing overall system performance, it is desirable to minimize spectroscopic variances (other than those related to the analyte of interest). Illumination system variances include all variances due to different tamps, due to tamp aging, due to placement of the tamp in the instrument or any other variance that results due to a change in tamp performance or how the radiation source interacts with the remainder of the optical system. With current illumination systems, radiation emitter variances can cause spectroscopic variances, illumination system variances unrelated to either the sample of interest or the analyte being measured can result in prediction errors and necessitate the need for re-calibration. Re-calibration is generally undesirable due to increased expense and down time on the instrument. Thus, in maximizing overall system performance, it is desirable to minimize illumination system variances.

To achieve increased accuracy in the measurement of analyte concentration, a practitioner of the art must, among other things, strive either to eliminate interferents or to construct a chemometric model that is sensitive to the differences between interferents and the desired analyte. Fortunately, spectral changes due to interferents are seldom identical to spectral changes due to changes in analyte concentration. Thus, the ability of a chemometric model to distinguish between an interferent and a particular analyte is typically improved by increasing the size of the calibration set.

In the presence of significant spectroscopic variance and when the degree of overlap (spectral similarity) between the analyte and the interferent is high, the number of model "factors" required to adequately distinguish between the interferent and the analyte will be large (the model complexity will be high). Unfortunately, in the presence of measurement noise, there are practical limitations associated with the number of model factors that can be used effectively. The ability of the practitioner to improve the sensitivity of the model to differences between the interferent and the analyte by increasing the size of the calibration model will be limited by the presence of noise in the measurement which limits the ability to distinguish between the spectra of the interferent and the analyte. In systems where there is a high degree of overlap between interferents and the particular analyte of interest, the practitioner generally strives to reduce the amount of spectroscopic interference, specifically instrument variance.

In spectrophotometer instruments where shot noise is the predominant source of measurement noise in the instrument, the signal-to-noise ratio (SNR) for the instrument is directly proportional to the square root of the flux ($\Phi$) on the photodetector. Thus, for these instruments, the SNR can be improved by maximizing the amount of light incident on the detector. For measurements on biological tissue, however, the practitioner cannot increase the flux on the detector without limit. Increasing the flux on the detector generally necessitates increasing the incidence on the tissue. The increased incidence on the tissue can result in thermal damage to the tissue. Therefore, there are practical limits on how much light can be incident on the tissue.

Significant improvement in spectroscopic optical analysis, particularly quantitative determination of analytes in biological tissue, can be achieved if the above-identified problems are minimized or eliminated. In particular, if illumination system variances can be eliminated or substantially reduced as an interferent the complexity (number of model factors) of the model can be reduced and the net analyte signal increased. This can result in reduced instrument variance and increase the predictive accuracy of a model, particularly in situations where the interferent has substantial overlap with the analyte of interest in the tissue. It is further important that a system that eliminates or reduces instrument interferents also minimizes measurement noise.

BRIEF DESCRIPTION OF THE FIGURES

FIG. 1($a,b$) comprise schematic depictions of two optical measurement systems useful in connection with the present invention.

FIG. 2(a,b) comprise side and top section views of an example embodiment of the present invention.

FIG. 10(a,b) comprise schematic depictions of two views of an example integrated source/sampler embodiment of the present invention.

FIG. 12(a,b) comprise schematic depictions of two views of an example integrated source/sampler embodiment of the present invention,

DETAILED DESCRIPTION OF THE INVENTION

Figure 1A:
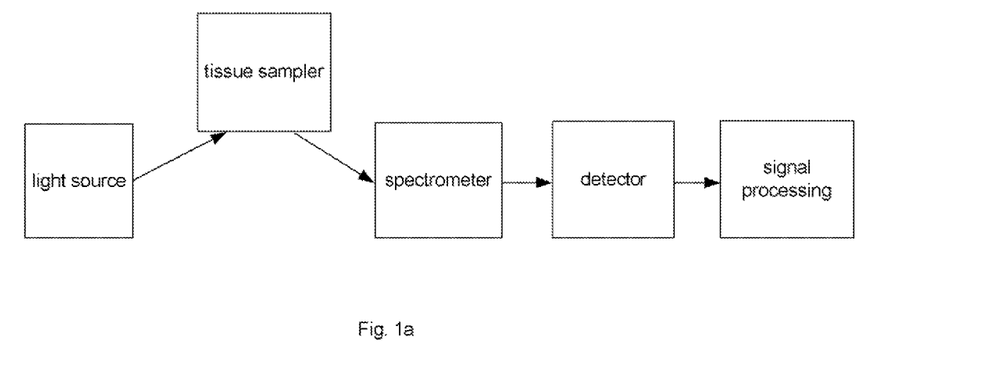
Figure 1B:
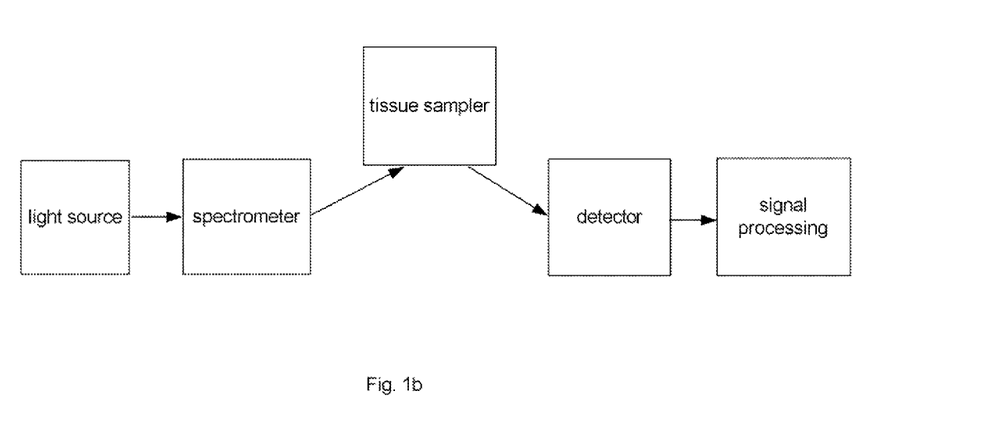

FIGS. 1a and 1b show two possible configurations of a non-invasive tissue measuring system. The present invention can provide apparatus and methods that eliminate or reduce angular and spatial changes in the light source or illumination system for either of these configurations and can provide a combined light source and tissue sampler for the second configuration. The present invention can also minimize tissue heating while maintaining high signal-to-noise ratio. The present invention can also minimize the number and size of components in the illumination/collection system and minimize the need for custom alignment of components during assembly.

A prior art approach related to FIG. 1a has been to focus the image of a high temperature quartz tungsten halogen (QTH) lamp on the input of a fiber optic bundle, which, in turn, distributes the light over the surface of the tissue, The same approach has been used with the configuration of FIG. 1b wherein the image of the lamp is focused on the input aperture of the spectrometer. Problems with this approach are briefly described below.

A QTH lamp emits like a blackbody in that light per unit area of filament is proportional to the surface temperature of the filament. Thus, in order to maximize the available signal at any wavelength the temperature of the filament must be maximized. In order to maximize the amount of energy on a small fiber optic bundle or spectrometer aperture it is necessary to use a filament of small area and run it at as high a temperature as possible. If the imaging system is made to just fill the fiber optic bundle with the filament image at the maximum acceptable numerical aperture, increasing the filament area will not result in more signal because the image wilt overfill the collection aperture. More power must be provided to run the larger filament at a given temperature but no more light enters the fiber bundle. Likewise there are limitations on the filament operating temperature that can be used. One of the consequences of high temperature operation is short tamp lifetime.

For the measurement of glucose and a number of other blood constituents, it is found that although a range of wavelengths is needed, long wavelength light, in the region of 2.3 microns (4300 wavenumbers) is of more value than shorter wavelength light. Operating the filament at a high temperature can cause an excessive amount of light to be generated at short wavelengths. If allowed to propagate unattenuated the excess short wavelength light degrades the signal-to-noise ratio (SN R) in spectrometers, such as Fourier transform spectrometers, that collect light from all wavelengths simultaneously onto a single detector. It also contributes to tissue heating. This has lead to requiring absorbing or reflecting spectral filters to remove excess light in short wavelength regions. As a result, a large portion of the electrical energy supplied to the lamp is simply converted to heat without improving SNR.

The image of the filament is not completely stable. As the lamp ages the filament moves around, giving a slightly varying spatial and angular distribution. This causes calibration maintenance problems. Changing lamps causes even worse problems because of the variation in filament position from lamp to lamp. This has led to the use of ground glass diffusers to randomize the angular distribution and a hexagonal cross section light pipe to randomize the spatial distribution of light. These have worked satisfactorily but have considerably reduced the light available for tissue illumination.

The present invention can reduce the undesirable effects discussed above by use of a non-imaging illuminator and a tow temperature lamp. An example non-imaging illumination device is an integrating sphere. An integrating sphere illumination system generally consists of one or more tamps inside a hollow sphere with all diffuse reflective walls. A baffle is often incorporated to prevent direct illumination of the output port by the lamp filament. An output port of a properly constructed integrating sphere illuminator then provides a uniform, or Lambertian, radiance pattern over a 2pi steradian field. Light generated inside an ideal integrating sphere undergoes multiple reflections until it finds its way out through the exit port. For a sphere of perfect reflectance, all the light will eventually find its way out of an arbitrarily small port. In practice, the sphere reflectance cannot be made perfect and so there are real tosses that can seriously limit the efficiency of light transfer. A significant portion of the light is lost by absorption in the walls of the sphere. The efficiency is generally a strong function of the ratio of exit port area to sphere surface area. The integrating sphere eliminates angular and spatial dependency on filament geometry, allowing an arbitrarily large filament to be placed anywhere within the sphere. Prior integrating spheres, however, suffer from tow efficiency. The present invention significantly improves the efficiency white maintaining the other desirable features of the integrating sphere.

As described above the integrating chamber can be used to reduce the effect of variability in position of an internal light source when it is desired to create a light source with spatially invariant properties. Likewise, those skilled in the art will recognize that some embodiments of the present invention can also be used in the reverse sense, to collect light rather than emit it: taking light input from one geometry, scrambling it, and collecting it with an internal detector or port of another geometry. For example, some embodiments of the present invention can be used to collect light into the integrating chamber from a narrow slit and detect it with a circular shaped detector. In some applications, the importance of high throughput can be greater than the importance of thorough scrambling, making it more desirable to make the integrating chamber with all specular reflecting walls. Example embodiments showing these several uses are described below.

Figure 2:
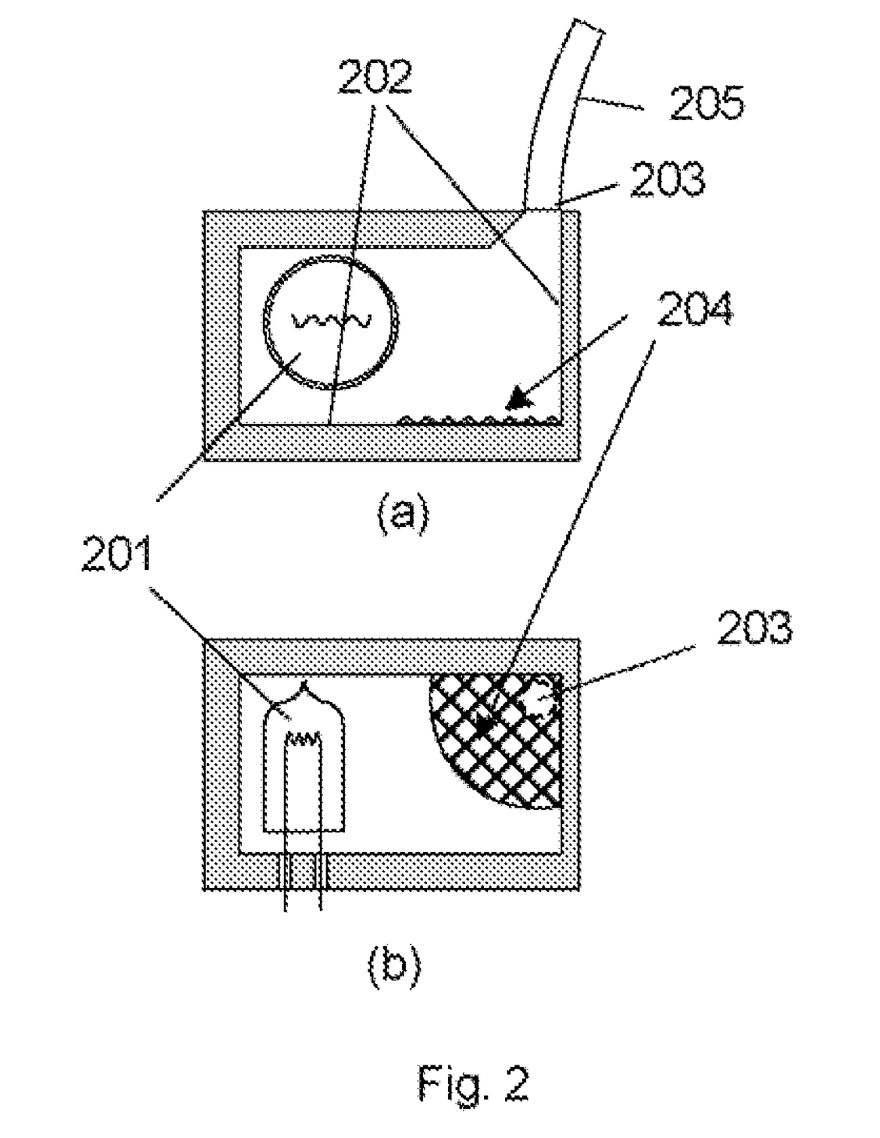

FIG. 2(a,b) shows two cross sectional views (side in FIG. 2(a), top in FIG. 2(b)) of an example integrating chamber light source suitable for illumination of a fiber optic bundle 205 or other limited numerical aperture (NA) optical collection system. A lamp 201 is contained within a rectangular chamber with highly reflecting walls 202. The chamber is completely enclosed except for a port 203 for the light to exit and small holes for electrical wires. A surface opposite the exit port 203 has a diffusely reflecting region 204. All other surfaces are specular (i.e. mirror like) and of high reflectance. In this simple proof-of-concept design there is no internal baffling. The limited NA of the fiber bundle serves to reject non-diffuse light falling outside this NA.

The overall surface area of the chamber can be minimized. The chamber can be made just big enough to incorporate the light source and exit port. This minimizes the number of reflections a ray must undergo to exit the chamber and thereby minimizes the losses.

The diffuse surface area can be minimized, consistent with the desire that all output light within the fiber NA must reflect from this surface at least once. In order to minimize the diffuse area and total chamber wall area a circular exit port can be placed next to the intersection of two reflective walls perpendicular to the port surface. These walls reflect the diffuse surface, allowing the diffuse surface to be only slightly larger than one fourth of what it would need to be if the exit port axis were located in the center of the diffuse area. The use of perpendicular specularly reflective walls surrounding the diffuse surface also provides multiple reflected images of the lamp to illuminate the diffuse surface from all directions, more uniformly illuminating the surface.

The entire emissive surface of the lamp contributes to the light being emitted from the output port. In contrast, in an imaging system only light emitted over a relatively narrow range of angles can be collected.

The example of FIG. 2 has flat walls at right angles to each other, but other geometries are possible, including spherical. With all geometries, the diffuse area can be minimized and little or no specular light can be allowed to leave the exit port within the acceptance NA of the measurement system. Calculations and experimental results have shown that a chamber built in this way can significantly exceed the efficiency of the common integrating sphere while still maintaining the excellent output spatial and angular randomization necessary for many optical measurement systems. In practice, it has been found that specular reflecting walls have a higher reflectance than diffuse reflecting walls. For example, at a wavelength of 2.3 microns, a diffuse surface plated with gold is measured to have a hemispherical reflectance of about 96%, whereas a 99% reflectance is obtained for a gold plated specular surface it is believed that this is due, in part, to the fact that at a diffuse surface a ray may undergo more than one reflection between facets before departing the surface, a phenomenon similar to that encountered by a ray impinging on a cube corner retroreflector. The actual surface area of a diffuse surface is larger than that of a specular surface covering the same planar area.

Figure 3:
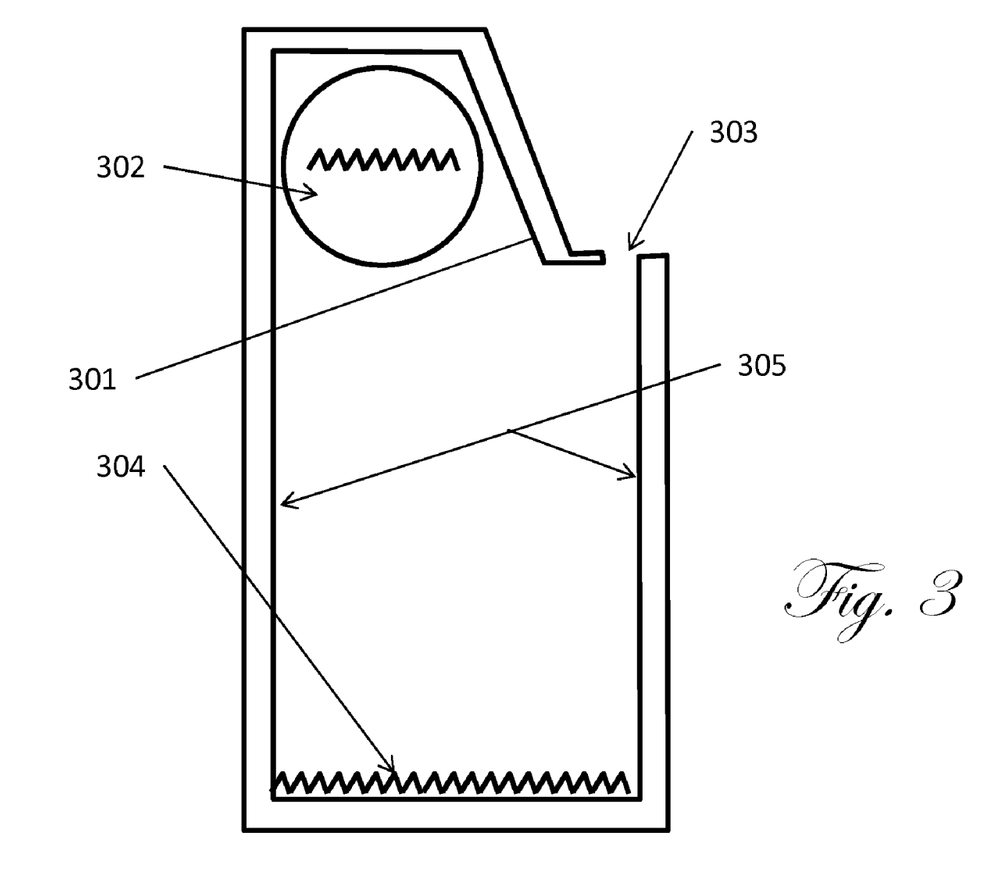
FIG. 3 is a schematic depiction of a sectional view of an example embodiment of the present invention.

A variant geometry for the integrating chamber is illustrated in the cross section shown in FIG. 3. Here a baffle wall is placed between the source 302 and exit port 303 to prevent any direct illumination of the exit port by the source. Further, the entire surface 304 opposite the exit port is diffuse and all other surfaces 305 are specularly reflective. Again, the efficiency can be optimized by maintaining a minimum size for the diffuse surface. The distance between the exit port and the opposite diffuse surface can be made large enough that all light emitted from the exit port within the desired numerical aperture exits by direct reflection from the diffuse surface or by one reflection from one of the specular reflective walls adjacent to the diffuse surface.

In the example of FIG. 3, all light escaping from the exit port, whether inside or outside the desired NA, has exited by at least one reflection from the diffuse surface, thus providing a uniform distribution of the exiting light that is not strongly dependent on the exact shape or position of the source. This can be important in cases where the collection aperture of the device being illuminated by the exit port of the chamber does not have a precise NA cutoff. This might be the case, for example, when coupling the output with a short length of fiber optic cable. The NA of an optical fiber is usually determined by the difference between the refractive index of the core and cladding materials. For angles of incidence on the fiber input smaller than the calculated NA, a ray will reflect from the core/cladding interface by total internal reflection, a nearly lossless process. As the angle of incidence increases beyond the calculated NA some of the light will escape at each reflection from the interface and be lost by absorption in the surrounding medium. Since, in a long fiber, there are a large number of reflections from the core/cladding interface light at angles outside the effective NA are rapidly attenuated. However for a short length of fiber a small amount of light outside the desired NA can be transmitted. If the exit port contains non-diffuse light this kind of propagation might adversely affect the stability of the final angular and spatial distribution of light at the far end of the fiber.

Figure 4:
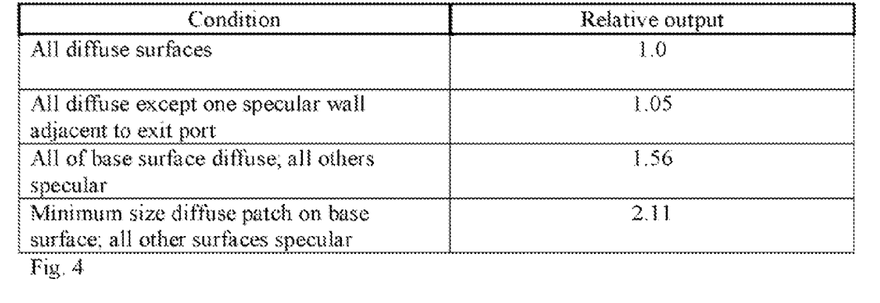
FIG. 4 is a concord relating chamber condition to relative output for an example implementation of the present invention.

To validate the concept of an integrating chamber source, a chamber similar to FIG. 2 has been built and tested in several configurations. Each configuration differed only in the walls that were diffuse or specular. The total surface area was constant for all cases. All surfaces, whether specular or diffuse, were gold plated using the same process. Diffuse surfaces were garnet blasted before plating to give a rough texture. Only light within a 0.65 NA was collected and measured. This NA was chosen because it matched the upper limit of numerical apertures available for Teflon clad fused silica fibers. A measurement wavelength of 2.32 microns was used. FIG. 4 summarizes the results. The output is an inverse function of the area of the diffuse surface. By minimizing the ratio of diffuse area to total area the efficiency was more than doubled without compromising the spatial and angular randomization afforded by the diffuse surface and multiple internal reflections. These results are similar to the results of ray trace simulations using these geometries.

Figure 5:
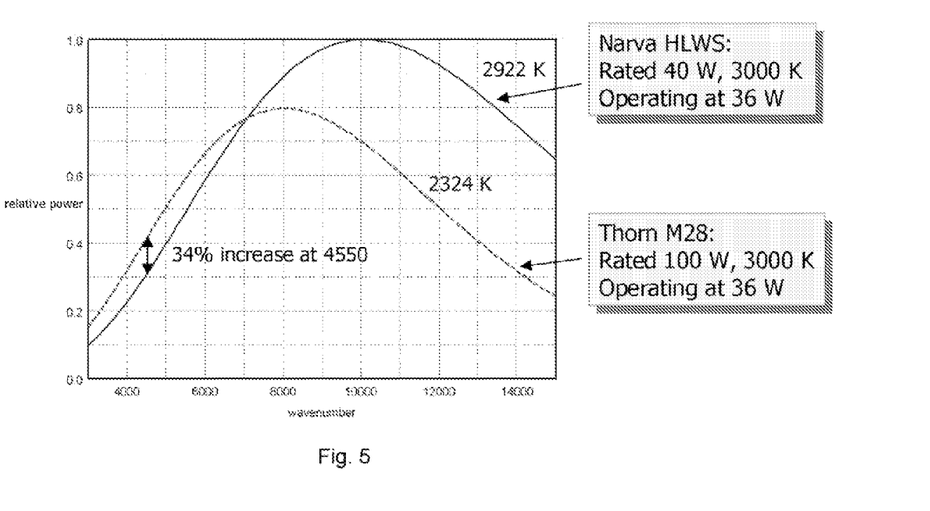
FIG. 5 is a graph depicting the comparison of theoretical spectral output of two lamps.
Figure 6:
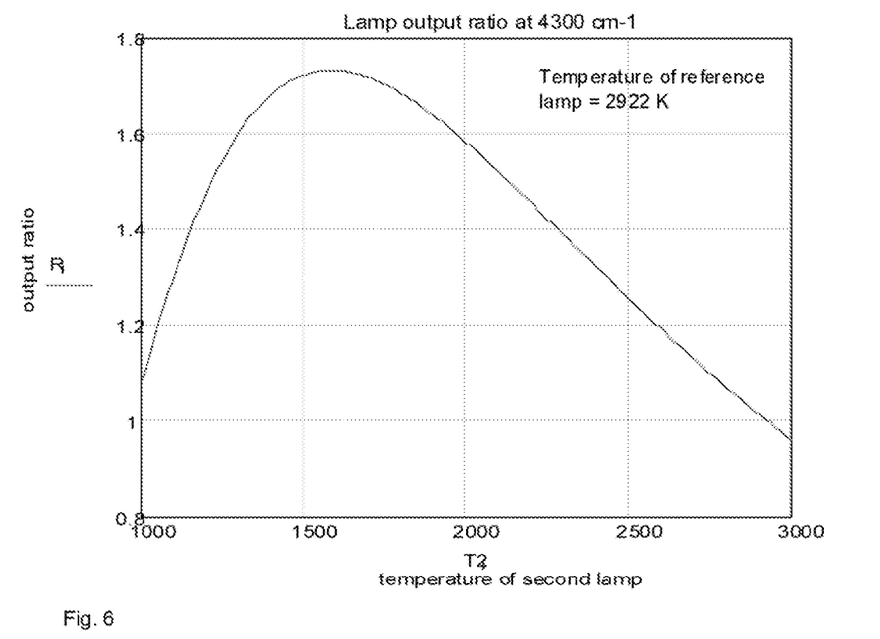
FIG. 6 is a graph depicting the relative lamp output at 4300 cm-1 (2.3 microns) relative to black body temperature for constant input power.

The present invention allows the use of an incandescent source with a large surface area and low temperature to replace one with a small surface area and high temperature, since the illumination system no longer depend on focusing the image of a small filament on a small fiber bundle. As an example, FIG. 5 compares the theoretical blackbody curves of two lamps operating at the same input power. A constant emissivity has been assumed for simplicity in this illustration although, in practice, emissivity can vary with wavelength and lamp filament construction geometry. Both lamps have a color temperature of 3000 K at their rated input power. One lamp is rated at 40 W and the other at 100 W. The lamp designed for 100 W use has a much larger filament surface area. Both have the same quartz envelope dimensions, so they can be used in the same size integrating chamber. When both lamps are operated at an input power of 36 W the operating temperatures become 2922 K and 2324 K respectively. The curve shows that the cooler lamp should produce about 34% more light at a wavelength of 2.2 microns (4550 wavenumbers) and at least 40% less light at wavelengths below about 1.4 microns (7150 wavenumbers). Experiments have shown that incandescent lamps of different manufacturers and different filament shapes differ considerably in their effective emissivity as a function of wavelength and, thus, these theoretical curves are not followed exactly. When two lamps meeting the above description were tested in the integrating chamber used to generate the table of FIG. 4, it was found that the actual efficiency improvement at the long wavelength experienced by using the cooler lamp was only about 11% instead of the predicted 34%. Other lamps have shown a larger than predicted improvement. Staying with the theoretical black body curve, we can determine what temperature should yield the highest efficiency at a wavelength of 2.3 microns. FIG. 6 shows this relative efficiency as a function of temperature. FIG. 6 indicates that the best temperature for operation at this wavelength should be about 1600 K.

A further improvement in efficiency was achieved in an experiment using a hot surface igniter. The igniter is a solid ceramic composite resistive element that operates in air without a glass envelop. Such devices are manufactured by Saint-Gobain Ceramics (formerly Norton Igniter), and others and are typically used, for example, to ignite gas in a furnace. It operates at a temperature somewhat below 1600 K but it has much higher emissivity than a tungsten filament at a wavelength of 2.3 microns. This device is also suitable for use with the present invention because it does not have an envelope to absorb light during the multiple passes of the rays through the chamber. In experiments with these devices it was necessary to burn them in for a period of several hours outside the integrating chamber to eliminate initial outgassing products that would have otherwise coated the chamber walls. The igniter is also physically small compared to a lamp with an envelope, allowing the chamber to be made smaller. Experiments have been performed using a Gilway QTH lamp rated at 250 W, operating at around 18 W and using a Norton igniter at about the same power, Both of these show large improvements in efficiency at 2.3 microns compared to higher temperature lamps.

Another significant benefit from the use of cooler lamps with the present invention is the reduction or elimination of tissue burning without the use of spectral absorbing filters to reduce the short wavelength light intensity. As an example, for a given electrical input power, a lower temperature lamp will produce more usable signal at 2.3 microns, a wavelength region of greatest interest. The desired signal to noise ratio can be achieved with a lower electrical input power, thereby reducing the total incident radiation on the tissue.

Experiments on a glucose measuring system, comparing a new integrating chamber illumination source with previously developed high temperature focused source system shows that the present invention produces less disturbance of the instrument calibration when lamps are replaced or moved. Equivalent signal levels have been achieved using less than half the input power of the previous system.

The integrating chamber illumination system of the present invention is not restricted to the illumination of circular fiber optic bundles. It can also be used to illuminate a thin sheet light guide or other arbitrary shape. It can also be used directly as the input to a wide variety of optical systems requiring a stable angular and/or spatial distribution of light.

The present invention can provide numerous advantages over prior art illumination systems, including: smaller physical size; no critical lamp alignment required; less power consumption for equivalent signal, no filters required to prevent tissue burning; no ground glass diffusers or light pipes required for spatial and angular scrambling of the light as required in previous glucose measuring systems; much longer incandescent lamp lifetime; ability to illuminate a wide variety of shapes by shaping the output port of the integrating chamber; and significant reduction in cost of production.

Figure 7:
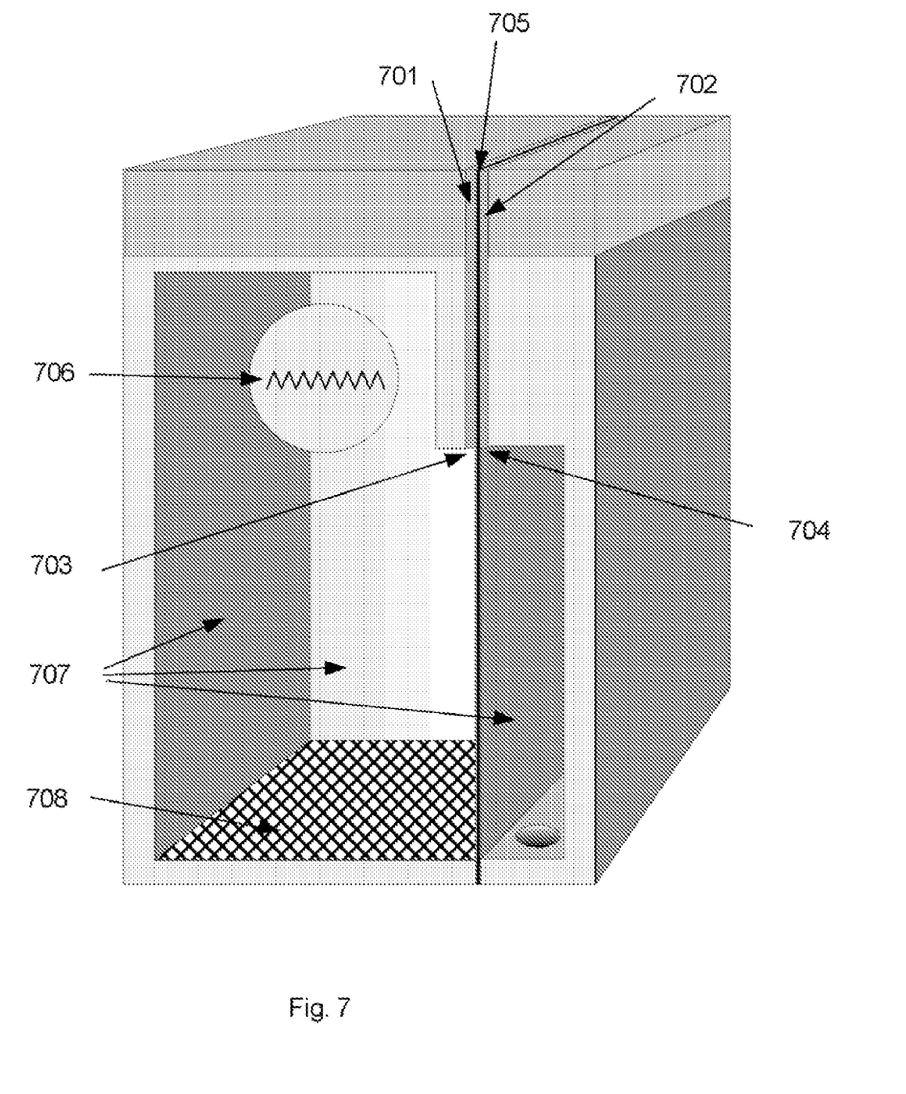
FIG. 7 is a schematic depiction of an example embodiment of the present invention.

The integrating chamber can also be combined with a delivery and collection system to provide a stable, compact device for tissue illumination and light collection for analysis. A tissue sampler generally comprises two parts: a tissue illumination portion and a light collection portion. In order to be useful in the spectral region of 1.3 to 2.5 microns it can be desirable to separate the illumination and collection portions of the sampler by a small distance, on the order of 100 to 1000 microns. Light traveling too short a distance through the tissue does not have sufficient absorbance signal from the analytes of interest and light traveling too large a distance will be attenuated too much by absorption and scattering in the tissue. One useful arrangement for providing this kind of source/collector separation is shown in FIG. 7. A lamp 706 mounts within a chamber having specular reflecting surfaces 707 and diffuse reflecting surfaces 708, as discussed before. A thin sheet light guide 701 constitutes the integrating light source chamber output port 703. This light guide can comprise, for example, a fused silica sheet coated on the sides with Teflon AF. The Teflon has a lower refractive index than the fused silica providing for total internal reflection at the fused silica/Teflon interface. In order to suppress the propagation of light outside the desired NA the opposite side of the Teflon coating can be in contact with a heavily absorbing material, for example a carbon impregnated high refractive index polymer. Other materials, especially those commonly used to fabricate fiber optic cables and fiber optic faceplates, can also be used. The output end of the illumination light guide then provides a thin line of uniform illumination that can be placed in contact with the tissue to be measured. In FIG. 7 light collection from the tissue is also accomplished through the use of a light guide 702 and integrating chamber. A thin sheet 705 of opaque material separates the input and output light guides to provide the desired spacing and isolation between the two. The output integrating chamber contains an input port 704 from the tissue, provided by the thin light guide sheet 02, an output port, sized to interface with the next component in the measurement system, and a chamber with all specularly reflective walls. In this case, the tissue is relied on as a sufficiently diffuse source so that the chamber need provide no additional diffusion. The collection chamber collects the light from the narrow line interface and reconfigures it into a form more suitable for coupling to the next component in the system, for example a spectrometer or detector. A system similar to that illustrated in FIG. 7 has been built and tested with good success using illumination and collection sheet widths of 500 microns and an edge-to-edge separation of 100 microns.

Figure 8:
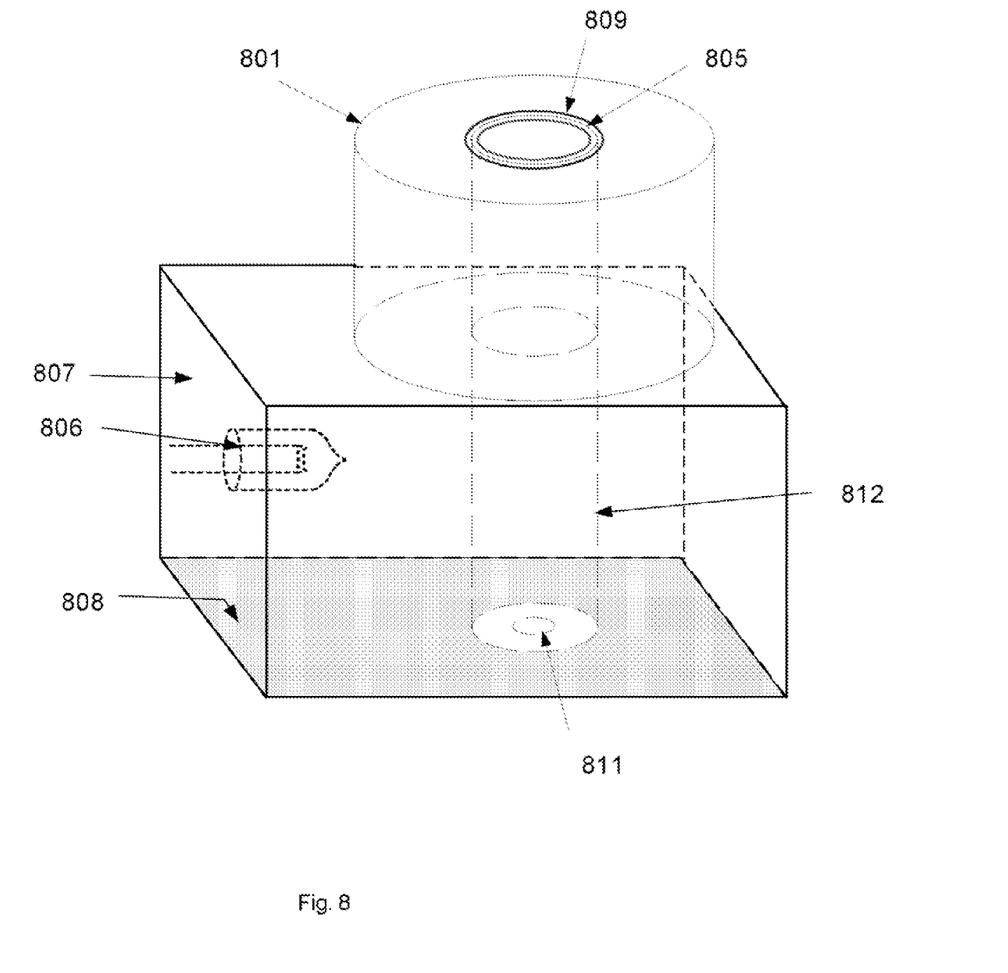
FIG. 8 is a schematic depiction of an example embodiment of the present invention.

Another example of an integrated system is shown in FIG. 8. The hollow collection chamber of the FIG. 7 example is replaced by a solid chamber 812 comprising a transparent material, such as fused silica. The side walls are surrounded by a dielectric material 805 of tow refractive index so that reflections within the chamber 812 off of these walls can take place by total internal reflection. The top 810 and bottom 811 surfaces are coated with a highly reflective material with transmissive features masked into the reflector pattern. For example, at the edge closest to the source a thin transmissive line 809 is included, taking the place of the thin light guide sheet in FIG. 7. On the opposite surface a circular transmissive opening 811 is defined, corresponding to the hole in the hollow chamber of FIG. 7, providing an exit to the next optical component in the measurement system. The reflective coating can consist of a metal or a multilayer dielectric designed to be reflective in the spectral region of interest. In a similar manner, the thin sheet light guide output of the source chamber of FIG. 7 can be replaced by a thicker slab 801 of transparent material as illustrated in FIG. 8. This slab is coated in the same way as the solid collection chamber, except that the end inside the source chamber is left uncoated to allow light to enter. A source 806 mounts with a chamber having specular reflective 807 and diffuse 808 surfaces. An advantage of the FIG. 8 configuration is that the solid collection chamber can, in some cases, be made more efficient than the hollow chamber especially where the wavelength region to be covered is small. For example, a multi-lay dielectric reflector can be made with a reflectance of greater than 99.9% over a narrow spectral region. Other advantages relate to fabrication preferences, where it can be easier to produce the desired optical finish and provide the required mounting with a thick slab compared to a thin sheet. FIG. 8 also illustrates that the solid chamber may be used to generate illumination and collection geometries that might be difficult to produce with thin sheets. For example FIG. 8 shows a circular rather than linear illumination and collection geometry. Here the tissue illumination is done through a circular shaped line at the inner radius of a solid cylindrical annulus and the collection is done through a transmissive circular line formed at the outer edge of the collection chamber cylinder, as previously described.

Figure 9:
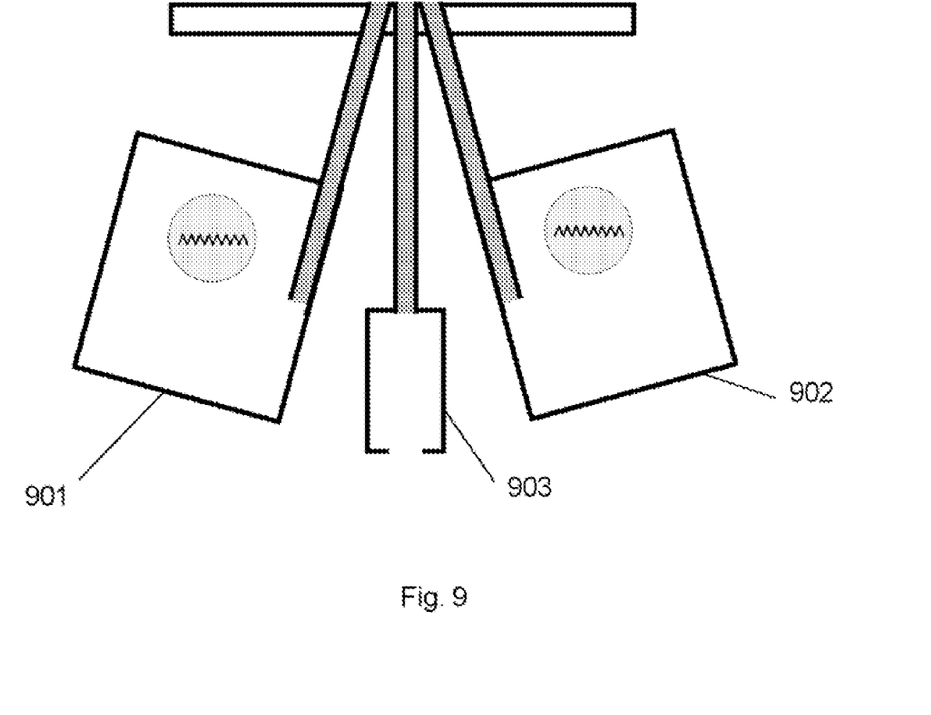
FIG. 9 is a schematic depiction of an example embodiment of the present invention.

FIG. 9 illustrates another example embodiment, wherein two illumination systems 901, 902 can be used to illuminate the tissue on both sides of a collection chamber sheet 903, providing more light while keeping source/collection separation small.

Figure 10A:
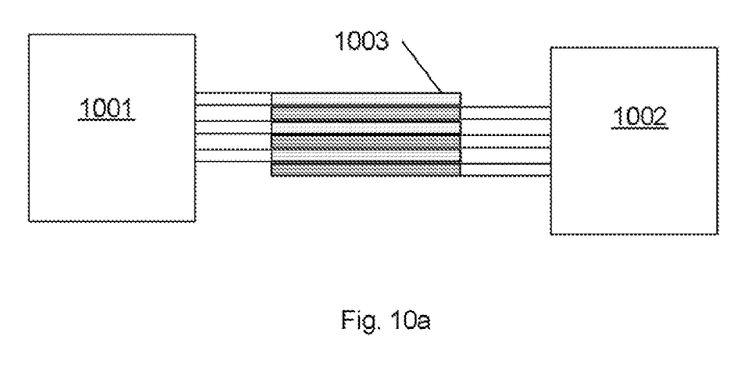
Figure 10B:
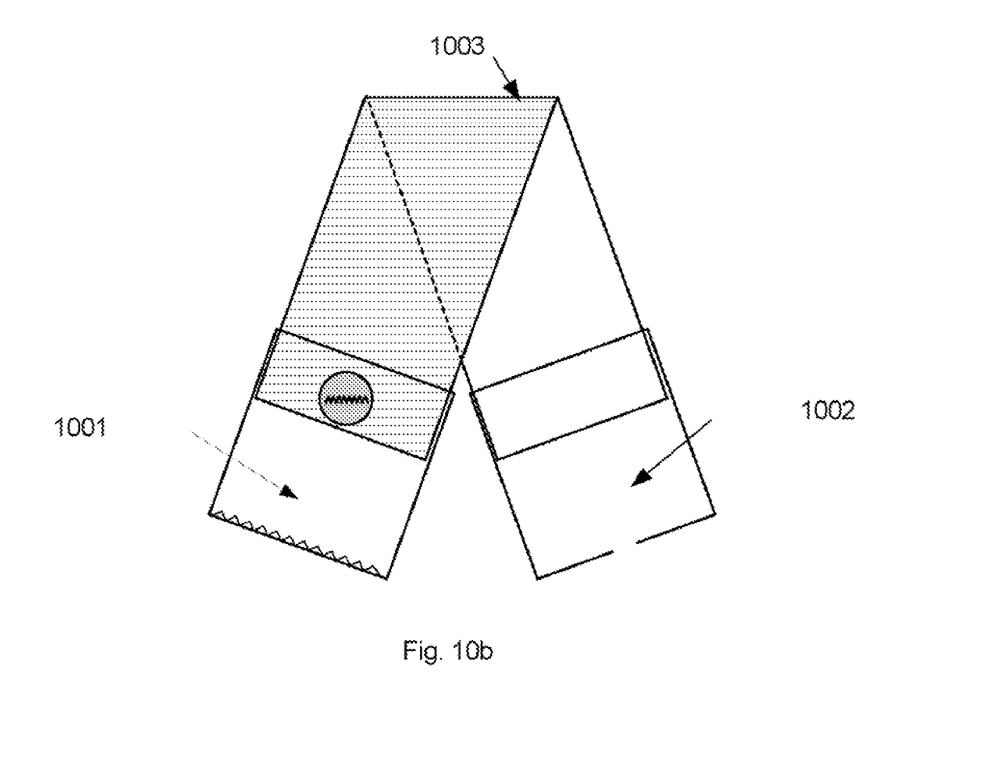

In order to cover a larger area of tissue and illuminate with more light multiple source sheets can be used, interleaved with multiple collection sheets. This is illustrated in the example embodiment shown in FIG. 10(a,b). FIG. 10a illustrates interleaving of the sheets from a source chamber 1001 and a collection chamber 1002. The interleaved sheets can be configured to present an integrated sampler surface 1003. In FIG. 10b the view has been rotated into the plane of the sheets to show the separation in that plane and the integrated sampling surface 1003. Here a single illumination chamber 1001 and a single collection chamber 1002 are used.

Figure 11:
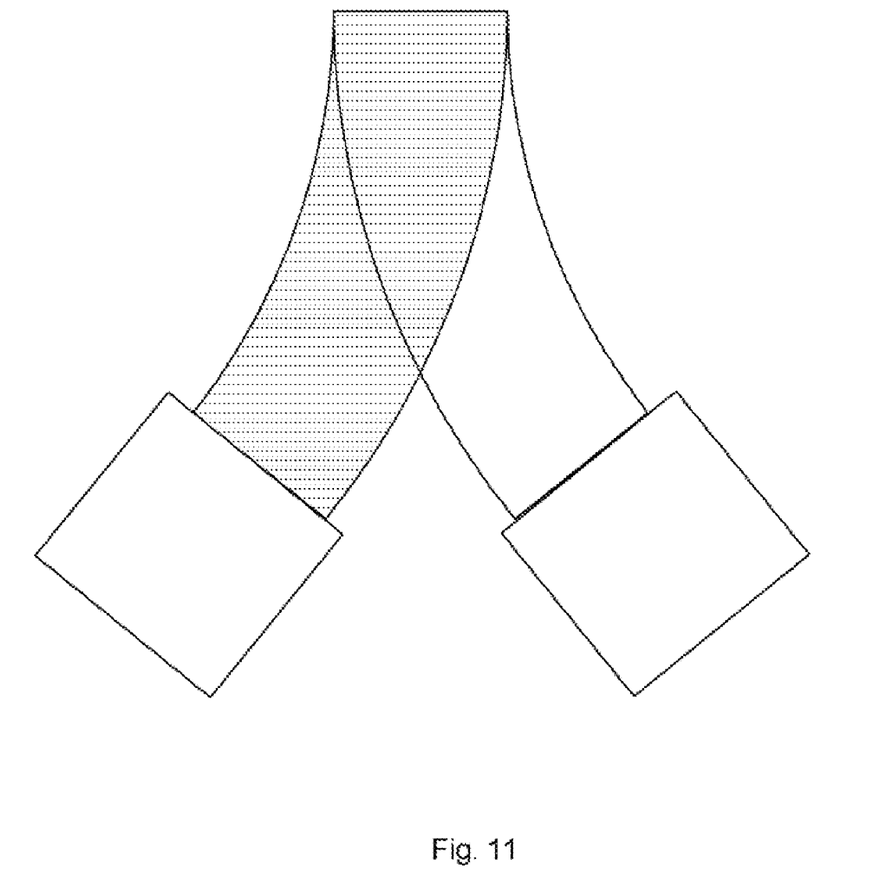
FIG. 11 is a schematic depiction of an example integrated source/sampler embodiment of the present invention.

In FIG. 10(a,b) the sides of the illumination and collection sheets are depicted as straight. In order to obtain the needed separation between input and output chambers the sheets can be angled as shown, resulting in a non-perpendicular relationship between the input and output surfaces relative to the sides. This can cause an angular bias in the range of angles that can be propagated through the sheets by total internal reflection. The example embodiment of FIG. 11 uses curved sides of the sheets on a circular arc so that the two ends are locally perpendicular to the sides. This increases the efficiency and angular distribution by improving the number of rays that will propagate by total internal reflection. Other arc or polygon shapes can be used to optimize the angle distribution or to optimize the fabrication process.

Figure 12A:
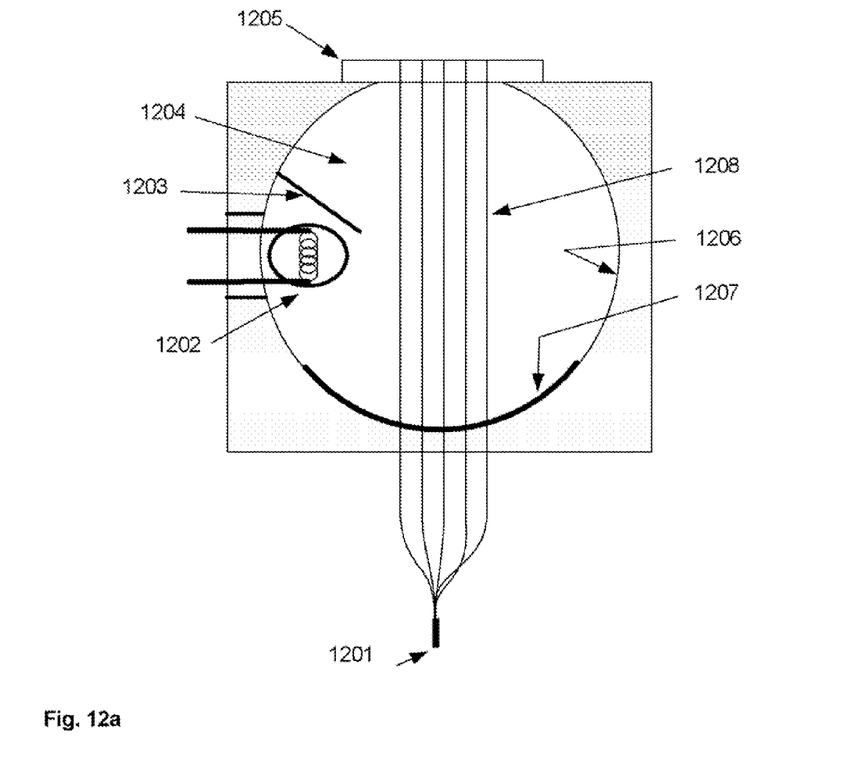
Figure 12B:
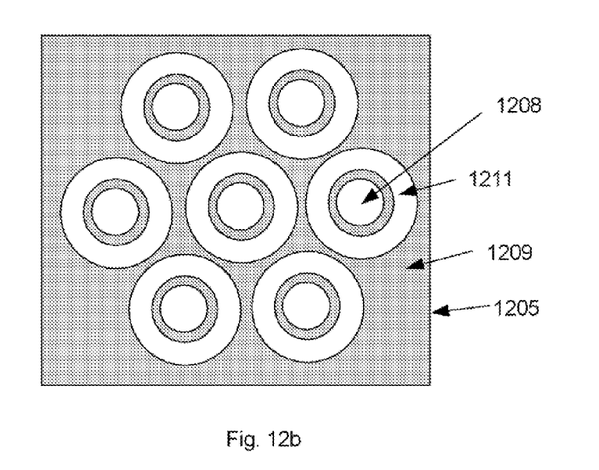

A tissue sampler can also be constructed using an integrating chamber light source like those described above combined with a fiber optic output collector. The sheet collector/integrating chamber in any of the previous tissue sampler examples can be replaced with a row of optical fibers, as illustrated by the example embodiment shown in FIG. 12(a, b). An integrating chamber illumination system comprises a source 1202 mounted within a chamber 1204 having specular reflective 1206 and diffuse 1207 surfaces. A baffle 1203 can mounts with the chamber 1204 to discourage light from the source 1202 from directly illuminating the sampler 1205. Optical fibers 1208 are embedded in a sampler window 1205 to collect light from the tissue, The fibers 1208 can be separated to allow light from the chamber to fully illuminate the region surrounding each fiber. The fibers can be routed through the illumination chamber and brought out through the chamber wall where they can be collected into a bundle 1201 for delivery to the next component in the measurement system. The sampler window 1205 can contain a reflective mask 1209 on the tissue side of its surface to allow each fiber 1208 to be separated from the other fibers and to be surrounded by a ring of illumination 1211 that maintains the desired close source/collector distance. The reflective mask 1209 reflects all light reaching the window surface that is not within this desired distance from a fiber. The portion of the optical fibers within the source chamber can also be coated with a sheath 1210 of opaque, highly reflective material to keep light from entering the fibers through the side walls of the fiber and to maintain high reflective efficiency within the chamber.

The reflective mask 1209 can be a fixed mask, or can be configurable, for example as a series of interchangeable masks or by implementation with a liquid crystal light valve. Configurable masks can allow programmable illumination/detection paths. For example, a configurable mask can allow orthogonal paths to be selectively enabled, or can allow varying distances between illumination and detection areas.

Those skilled in the art will recognize that the present invention can be manifested in a variety of forms other than the specific embodiments described and contemplated herein. Accordingly, departures in form and detail can be made without departing from the scope and spirit of the present invention as described in the appended claims.

What is claimed is:

1. An optical transmission device, comprising a chamber element having one or more surfaces which together define a chamber and having a light input into the chamber and having a first port allowing light to pass out of the chamber, wherein at least a portion of the one or more surfaces is diffusely reflecting, and wherein at least a portion of the one or more surfaces is specularly reflecting, and wherein the light input and the first port and the one or more surfaces are configured such that substantially all light entering the chamber via the light source within a first predetermined aperture must encounter the diffusely reflecting portion before exiting the chamber via the first port within a second predetermined aperture.

2. An optical transmission device as in claim 1, wherein the light input comprises a light source mounted with the chamber such that light from the light source is introduced into the chamber.

3. An optical transmission device as in claim 1, wherein the light input comprises a light source mounted within the chamber.

4. An optical transmission device as in claim 1, wherein the light source comprises a ceramic composite resistive element mounted within the chamber.

5. An optical transmission device as in claim 1, wherein the light input comprises a second port into the chamber allowing communication of light into the chamber.

6. An optical transmission device as in claim 1, wherein the one or more surfaces comprise a plurality of substantially planar surfaces, and wherein the diffusely reflecting portion comprises a portion of at least one of the substantially planar surfaces.

7. An optical transmission device as in claim 1, wherein the chamber comprises a blocking watt disposed within the chamber so as to block direct paths between the light input and the first port.

8. A light source apparatus, comprising: (a) a plurality of surfaces defining a chamber, (i) wherein the chamber has a first port allowing communication between the chamber and an optical system external to the chamber, and (ii) wherein at least one of the plurality of surfaces is diffusely reflecting, and iii. wherein at least one of the plurality of surfaces is specularly reflecting; (b) a source of light in communication with the chamber such that light from the source is communicated to the chamber; (c) wherein the diffusely reflecting surface and the first port are disposed relative to the communication with the light source such that light from the source must encounter the diffusely reflecting surface before encountering the first port within a predetermined numerical aperture.

9. A light source apparatus as in claim 8, wherein the surfaces define a substantially rectangular polyhedron, and wherein the first port comprises an opening in the polyhedron, and wherein the diffusely reflecting surface is configured to extend over the field of view of the first port into the polyhedron within the predetermined numerical aperture.

10. A light source apparatus as in claim 8, wherein the source of electromagnetic energy comprises a ceramic composite resistive element mounted within the chamber.

11. A light source apparatus as in claim 8, wherein the source of electromagnetic energy comprises a lamp mounted within the chamber.

12. A light source apparatus source as in claim 8, wherein the first port comprises an optical waveguide in electromagnetic communication with the chamber.

13. A light source apparatus as in claim 12, wherein the optical waveguide extends a distance into the chamber, and wherein the surfaces comprise a surface disposed between the optical waveguide and the communication of electromagnetic energy into the chamber.

14. An optical sampling apparatus, comprising: (a) a housing defining a chamber internal thereto, which chamber has at least a portion of its defining surfaces configured to be diffusely reflecting; (b) a light source mounted with the housing so as to emit light into the chamber; (c) an interface element mounted with the housing such that the interface element communicates light from inside the chamber to outside the chamber, and having a surface external to the chamber adapted to be placed in communication with a sample; (d) a plurality of light guides mounted with and extending from the surface of the interface element through the chamber, such that light incident on the portion of the light guides mounted with the surface of the element is transmitted by the light guides through the chamber, wherein the light guides are shielded to prevent substantial direct communication with the interface element or the chamber; (e) a baffle mounted with the housing and extending into the chamber such that substantially all paths from the emission of light into the chamber to the interface element encounter the diffusely reflection portion of the surface.

15. An optical sampling apparatus as in claim 14, wherein the interface element comprises a mask substantially preventing transmission of light having predetermined characteristics from passing from the chamber to the sample.

16. An optical sampling apparatus as in claim 15, wherein the mask is configurable.

* * * * *